United States Patent
Keski-Valkama

(10) Patent No.: US 12,399,033 B2
(45) Date of Patent: Aug. 26, 2025

(54) METHOD AND APPARATUS FOR GENERATING MAPS FROM ALIGNED GEOSPATIAL OBSERVATIONS

(71) Applicant: HERE GLOBAL B.V., Eindhoven (NL)

(72) Inventor: Tero Juhani Keski-Valkama, Zurich (CH)

(73) Assignee: HERE GLOBAL B.V., Eindhoven (NL)

( * ) Notice: Subject to any disclaimer, the term of this patent is extended or adjusted under 35 U.S.C. 154(b) by 427 days.

(21) Appl. No.: 17/652,953

(22) Filed: Mar. 1, 2022

(65) Prior Publication Data
US 2023/0280186 A1 Sep. 7, 2023

(51) Int. Cl.
*G01C 21/00* (2006.01)
*B60W 60/00* (2020.01)

(52) U.S. Cl.
CPC ....... *G01C 21/3867* (2020.08); *B60W 60/001* (2020.02); *G01C 21/3815* (2020.08);
(Continued)

(58) Field of Classification Search
CPC ............ G01C 21/3867; G01C 21/3815; G01C 21/3841; G01C 21/3878; B60W 60/001; B60W 2556/40
See application file for complete search history.

(56) References Cited

U.S. PATENT DOCUMENTS 10,969,232 B1 4/2021 Johnson et al.
2018/0023961 A1 1/2018 Fridman
(Continued)

FOREIGN PATENT DOCUMENTS

CN 112883200 A 6/2021
WO WO 2021/139283 A1 7/2021

OTHER PUBLICATIONS

F. Xue, X. Wang, J. Wang and H. Zha, "Deep Visual Odometry With Adaptive Memory," in IEEE Transactions on Pattern Analysis and Machine Intelligence, vol. 44, No. 2, pp. 940-954, Feb. 1, 2022, doi: 10.1109/TPAMI.2020.3014100. (Year: 2020).*
(Continued)

*Primary Examiner* — Anne Marie Antonucci
*Assistant Examiner* — Jordan T Smith
(74) *Attorney, Agent, or Firm* — ALSTON & BIRD LLP

(57) ABSTRACT

A method, apparatus and computer program product are provided for learning to generate maps from raw geospatial observations from sensors traveling within an environment. Methods may include: receiving a plurality of sequences of geospatial observations from discrete trajectories; aligning the discrete trajectories generating aligned geospatial observations; concatenating the aligned geospatial observations; performing attentional clustering on the concatenated, aligned geospatial observations to obtain a set of entities with feature dimensionality; processing the set of entities through an iterative attention model incorporating a Gated Recurrent Unit gating pattern to obtain attentional layer outputs; generating, from one or more Set Transformers, a feature set of map object geometries based, at least in part, on the attentional layer outputs; updating a map geometry based on the feature set from the Set Transformers generating an updated map geometry; and provide for navigational assistance or at least semi-autonomous vehicle control based on the updated map geometry.

20 Claims, 9 Drawing Sheets

(52) U.S. Cl.
CPC ..... *G01C 21/3841* (2020.08); *G01C 21/3878* (2020.08); *B60W 2556/40* (2020.02)

(56) References Cited

U.S. PATENT DOCUMENTS

| | | | |
|---|---|---|---|
| 2018/0188027 A1 | 7/2018 | Zhang et al. | |
| 2018/0188039 A1 | 7/2018 | Chen et al. | |
| 2018/0190016 A1* | 7/2018 | Yang | G01C 21/3867 |
| 2018/0194286 A1 | 7/2018 | Stein | |
| 2019/0384304 A1 | 12/2019 | Towal et al. | |
| 2020/0173805 A1 | 6/2020 | Viswanathan | |
| 2021/0063200 A1* | 3/2021 | Kroepfl | C03C 17/3644 |
| 2021/0191395 A1 | 6/2021 | Gao et al. | |
| 2021/0248460 A1 | 8/2021 | Sykora et al. | |
| 2021/0302992 A1 | 9/2021 | Chen et al. | |
| 2022/0011122 A1* | 1/2022 | He | G06N 3/044 |
| 2022/0153310 A1 | 5/2022 | Yang et al. | |
| 2022/0236077 A1 | 7/2022 | Clarysse et al. | |
| 2022/0237682 A1* | 7/2022 | Zhao | G06F 18/24 |
| 2022/0277472 A1* | 9/2022 | Birchfield | G06N 3/08 |
| 2022/0297728 A1 | 9/2022 | Varadarajan et al. | |
| 2023/0050402 A1* | 2/2023 | Keski-Valkama | G06T 3/14 |
| 2023/0100413 A1* | 3/2023 | Zhu | G06T 7/11 375/240.18 |
| 2023/0245373 A1 | 8/2023 | Xiong et al. | |
| 2023/0252224 A1* | 8/2023 | Tran | G06F 40/56 715/256 |
| 2023/0260271 A1* | 8/2023 | Creswell | G06V 10/82 382/103 |

OTHER PUBLICATIONS

Jaegle et al., "Perceiver: General Perception with Iterative Attention", arXiv:2103.03206v2, (Jun. 23, 2021), 43 pages.
"Wikipedia—Gated Recurrent Unit", Retrieved on Jul. 21, 2022, Retrieved via the Internet: <URL:https://en.wikipedia.org/w/index.php?title=Gated_recurrent_unit&oldid=1073979539>, (Feb. 25, 2022), 5 pages.
Mobiny et al, "Trans-Caps: Transformer Capsule Networks with Self-attention Routing", International Conference on Learning Representations 2021, (Sep. 28, 2020), 13 pages.
Jiang et al., "GAL: Geometric Adversarial Loss for Single-View 3D-Object Reconstruction", European Conference on Computer Vision 2018, (Oct. 7, 2018), 15 pages.
Henderson, J., "The Unstoppable Rise of Computational Linguistics in Deep Learning", Proceedings of the 58th Annual Meeting of the Association for Computational Linguistics, (Jul. 2020), 13 pages.
Prakash, J., "Non Maximum Suppression: Theory and Implementation in PyTorch", Retrieved on Jul. 13, 2022, Retrieved via the Internet: <URL:https://learnopencv.com/non-maximum-suppression-theory-and-implementation-in-pytorch/>., (Jun. 2, 2021), 13 pages.
U.S. Appl. No. 17/444,861, filed Aug. 11, 2021, entitled "Method and Apparatus for Generating Maps from Geospatial Observations", 39 pages.
U.S. Appl. No. 17/652,950, filed Mar. 1, 2022, entitled "Method, Apparatus, And Computer Program Product For Differential Variable Count Entity Output Head For Map Generation", 51 pages.
U.S. Appl. No. 17/652,951, filed Mar. 1, 2022, entitled "Method and Apparatus for Generating Maps from Aligned Geospatial Observations", 53 pages.
U.S. Appl. No. 17/652,952, filed Mar. 1, 2022, entitled "Method and Apparatus for Generating Maps from Aligned Geospatial Observations", 53 pages.
Girgis et al., "Latent Variable Sequential Set Transformers For Joint Multi-Agent Motion Prediction", arXiv:2104.00563v3, (Feb. 11, 2022), 26 pages.
Hunter et al., "The Path Inference Filter: Model-Based Low-Latency Map Matching of Probe Vehicle Data", IEEE Transactions on Intelligent Transportation Systems, vol. 15, No. 2, (Apr. 2014), 23 pages.
Lee et al., "Set Transformer: A Framework for Attention-Based Permutation-Invariant Neural Networks", Proceedings of the 36th International Conference on Machine Learning, (May 24, 2019), 10 pages.
Non-Final Office Action for U.S. Appl. No. 17/652,951 dated Mar. 21, 2024.
Non-Final Office Action for U.S. Appl. No. 17/652,952 dated Jun. 12, 2024.
Notice of Allowance for U.S. Appl. No. 17/652,950 dated Apr. 1, 2024.
Final Office Action for U.S. Appl. No. 17/652,951 dated Feb. 7, 2025.
Final Office Action for U.S. Appl. No. 17/652,952 dated Dec. 12, 2024.
Advisory Action for U.S. Appl. No. 17/652,951 dated Apr. 15, 2025.
Notice of Allowance for U.S. Appl. No. 17/652,952 dated Mar. 28, 2025.
Notice of Allowance for U.S. Appl. No. 17/652,951 dated Jun. 26, 2025.

* cited by examiner

METHOD AND APPARATUS FOR GENERATING MAPS FROM ALIGNED GEOSPATIAL OBSERVATIONS

TECHNOLOGICAL FIELD

Example embodiments of the present invention relate generally to the automatic generation of maps, and more particularly, to a system for learning to generate maps from raw geospatial observations from sensors traveling within an environment in a scalable and efficient manner.

BACKGROUND

Road geometry modelling is very useful for high-definition (HD) map creation and terrain identification along with feature and obstacle detection in environments, each of which may facilitate autonomous vehicle navigation along a prescribed path. Traditional methods for 3D modelling of road geometry and object or feature detection are resource intensive, often requiring significant amounts of human measurement and calculation. Such methods are thus time consuming and costly. Exacerbating this issue is the fact that many modern-day applications (e.g., 3D mapping, terrain identification, or the like) require manual or semi-automated analysis of large amounts of data, and therefore are not practical without quicker or less costly techniques.

Some current methods rely upon feature detection from image data to perform road terrain detection or environment feature detection, but these methods have deficiencies. For instance, some systems designed for terrain and feature detection around a vehicle exist but may be unreliable. Further, the reliability of feature detection may not be known such that erroneous feature detection or lack of feature detection may adversely impact autonomous or semi-autonomous driving. Over-estimating the accuracy of feature detection may cause safety concerns as object locations may be improperly interpreted as accurate when they are actually inaccurate, while under-estimating accuracy may lead to inefficiencies through overly cautious behaviors. Further, map data reconstruction of an environment may be inaccurate if object identification does not properly establish the location of an object in three-dimensional space due to inaccuracy during the detection stage.

BRIEF SUMMARY

Accordingly, a method, apparatus, and computer program product are provided for automatic generation of maps, and more particularly, to a system for learning to generate maps from raw geospatial observations from sensors traveling within an environment. In a first example embodiment, an apparatus is provided including at least one processor and at least one memory including computer program code, the at least one memory and the computer program code may be configured to, with the at least one processor, cause the apparatus to: receive a plurality of sequences of geospatial observations from discrete trajectories; align the discrete trajectories to generate aligned geospatial observations; concatenate the aligned geospatial observations; perform attentional clustering on the concatenated, aligned geospatial observations to obtain a set of entities with feature dimensionality; process the set of entities through an iterative attention model incorporating a Gated Recurrent Unit gating pattern to obtain attentional layer outputs; generate, from one or more Set Transformers, a feature set of map object geometries based, at least in part, on the attentional layer outputs; update a map geometry based on the feature set from each of the one or more Set Transformers to form an updated map geometry; and provide for at least one of navigational assistance or at least semi-autonomous vehicle control based on the updated map geometry.

According to an example embodiment, each of the one or more Set Transformers correspond to an object type, where the feature set from each of the one or more Set Transformers includes a set of map object geometries of the object type. The feature set of an example embodiment includes location information associated with a respective map object geometry. The map object geometries include, in some embodiments, point objects and linear objects, where point objects include at least one of signs or poles, and where linear objects include at least one of road markings or road boundaries.

According to certain embodiments, the objects from the geospatial observations are used to facilitate autonomous vehicle control. Causing the apparatus of some embodiments to align the discrete trajectories to generate the aligned geospatial observations includes causing the apparatus to apply a drive offset to each of the discrete trajectories to generate the aligned geospatial observations. The plurality of sequences of geospatial observations from discrete trajectories include, in some embodiments, unique trajectory identifiers for each discrete trajectory, where causing the apparatus of some embodiments to concatenate the aligned geospatial observations includes causing the apparatus to remove the unique trajectory identifiers associated with the geospatial observations.

Embodiments provided herein include a computer program product having at least one non-transitory computer-readable storage medium having computer-executable program code instructions stored therein, the computer-executable program code instructions including program code instructions to: receive a plurality of sequences of geospatial observations from discrete trajectories; align the discrete trajectories to generate aligned geospatial observations; concatenate the aligned geospatial observations; perform attentional clustering on the concatenated, aligned geospatial observations to obtain a set of entities with feature dimensionality; process the set of entities through an iterative attention model incorporating a Gated Recurrent Unit gating pattern to obtain attentional layer outputs; generate, from one or more Set Transformers, a feature set of map object geometries based, at least in part, on the attentional layer outputs; update a map geometry based on the feature set from each of the one or more Set Transformers to form an updated map geometry; and provide for at least one of navigational assistance or at least semi-autonomous vehicle control based on the updated map geometry.

According to an example embodiment, each of the one or more Set Transformers correspond to an object type, where the feature set from each of the one or more Set Transformers includes a set of map object geometries of the object type. The feature set of an example embodiment includes location information associated with a respective map object geometry. The map object geometries include, in some embodiments, point objects and linear objects, where point objects include at least one of signs or poles, and where linear objects include at least one of road markings or road boundaries.

According to certain embodiments, the objects from the geospatial observations are used to facilitate autonomous vehicle control. The program code instructions of some embodiments to align the discrete trajectories to generate the aligned geospatial observations includes program code instructions to apply a drive offset to each of the discrete trajectories to generate the aligned geospatial observations. The plurality of sequences of geospatial observations from discrete trajectories include, in some embodiments, unique trajectory identifiers for each discrete trajectory, where the program code instructions of some embodiments to concatenate the aligned geospatial observations include program code instructions to remove the unique trajectory identifiers associated with the geospatial observations.

Embodiments described herein include a computer program product having computer-executable program code portions stored therein, the computer-executable program code portions including program code instructions configured to perform any method disclosed herein.

Embodiments provided herein include a method including: receiving a plurality of sequences of geospatial observations from discrete trajectories; aligning the discrete trajectories to generate aligned geospatial observations; concatenating the aligned geospatial observations; performing attentional clustering on the concatenated, aligned geospatial observations to obtain a set of entities with feature dimensionality; processing the set of entities through an iterative attention model incorporating a Gated Recurrent Unit gating pattern to obtain attentional layer outputs; generating, from one or more Set Transformers, a feature set of map object geometries based, at least in part, on the attentional layer outputs; updating a map geometry based on the feature set from each of the one or more Set Transformers to form an updated map geometry; and providing for at least one of navigational assistance or at least semi-autonomous vehicle control based on the updated map geometry.

According to an example embodiment, each of the one or more Set Transformers correspond to an object type, where the feature set from each of the one or more Set Transformers includes a set of map object geometries of the object type. The feature set of an example embodiment includes location information associated with a respective map object geometry. The map object geometries include, in some embodiments, point objects and linear objects, where point objects include at least one of signs or poles, and where linear objects include at least one of road markings or road boundaries.

According to certain embodiments, the objects from the geospatial observations are used to facilitate autonomous vehicle control. Aligning the discrete trajectories to generate the aligned geospatial observations includes, in some embodiments, applying a drive offset to each of the discrete trajectories to generate the aligned geospatial observations. The plurality of sequences of geospatial observations from discrete trajectories include, in some embodiments, unique trajectory identifiers for each discrete trajectory, where concatenating the aligned geospatial observations includes, in some embodiments, removing the unique trajectory identifiers associated with the geospatial observations.

Embodiments provided herein include an apparatus including: means for receiving a plurality of sequences of geospatial observations from discrete trajectories; means for aligning the discrete trajectories to generate aligned geospatial observations; means for concatenating the aligned geospatial observations; means for performing attentional clustering on the concatenated, aligned geospatial observations to obtain a set of entities with feature dimensionality; means for processing the set of entities through an iterative attention model incorporating a Gated Recurrent Unit gating pattern to obtain attentional layer outputs; means for generating, from one or more Set Transformers, a feature set of map object geometries based, at least in part, on the attentional layer outputs; updating a map geometry based on the feature set from each of the one or more Set Transformers to form an updated map geometry; and means for providing for at least one of navigational assistance or at least semi-autonomous vehicle control based on the updated map geometry.

According to an example embodiment, each of the one or more Set Transformers correspond to an object type, where the feature set from each of the one or more Set Transformers includes a set of map object geometries of the object type. The feature set of an example embodiment includes location information associated with a respective map object geometry. The map object geometries include, in some embodiments, point objects and linear objects, where point objects include at least one of signs or poles, and where linear objects include at least one of road markings or road boundaries.

According to certain embodiments, the objects from the geospatial observations are used to facilitate autonomous vehicle control. The means for aligning the discrete trajectories to generate the aligned geospatial observations includes, in some embodiments, means for applying a drive offset to each of the discrete trajectories to generate the aligned geospatial observations. The plurality of sequences of geospatial observations from discrete trajectories include, in some embodiments, unique trajectory identifiers for each discrete trajectory, where the means for concatenating the aligned geospatial observations includes, in some embodiments, means for removing the unique trajectory identifiers associated with the geospatial observations.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
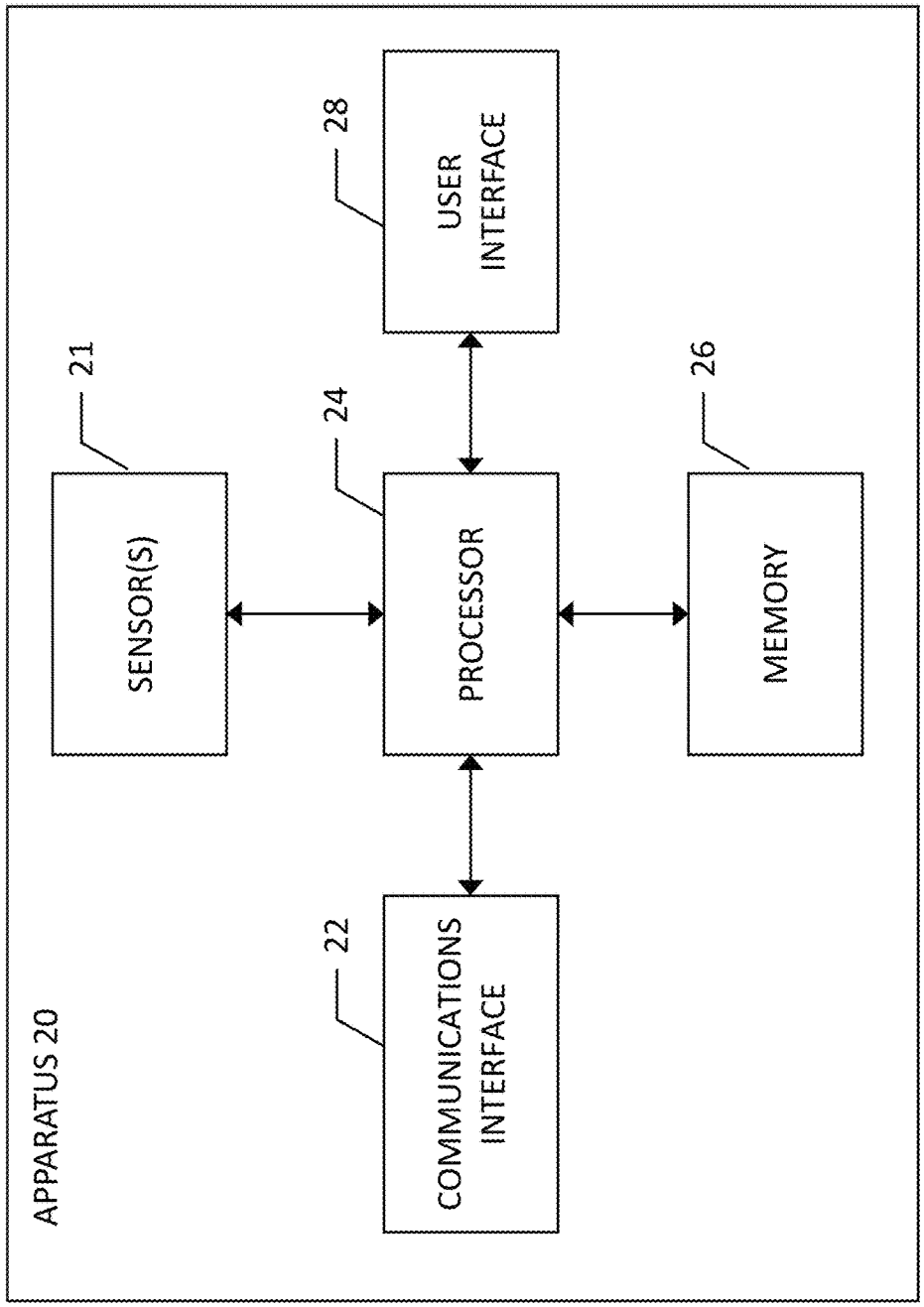
Figure 2:
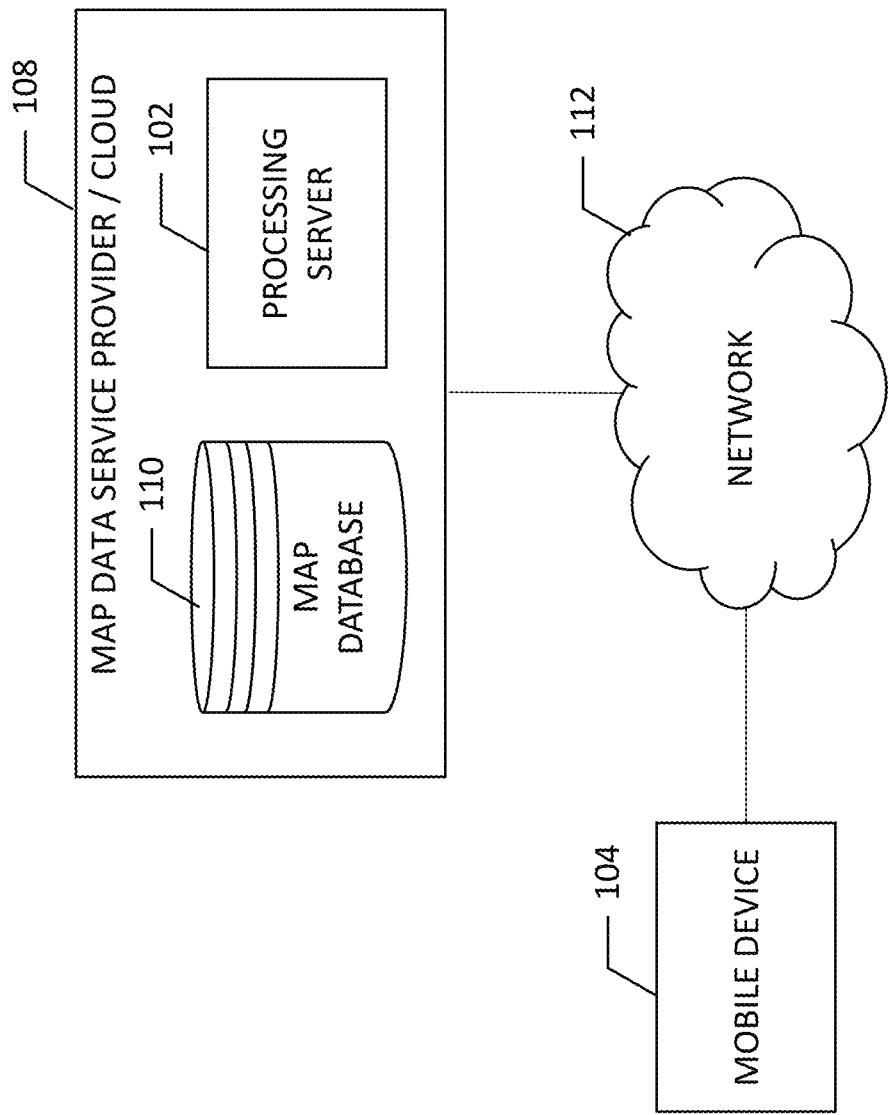
Figure 3:
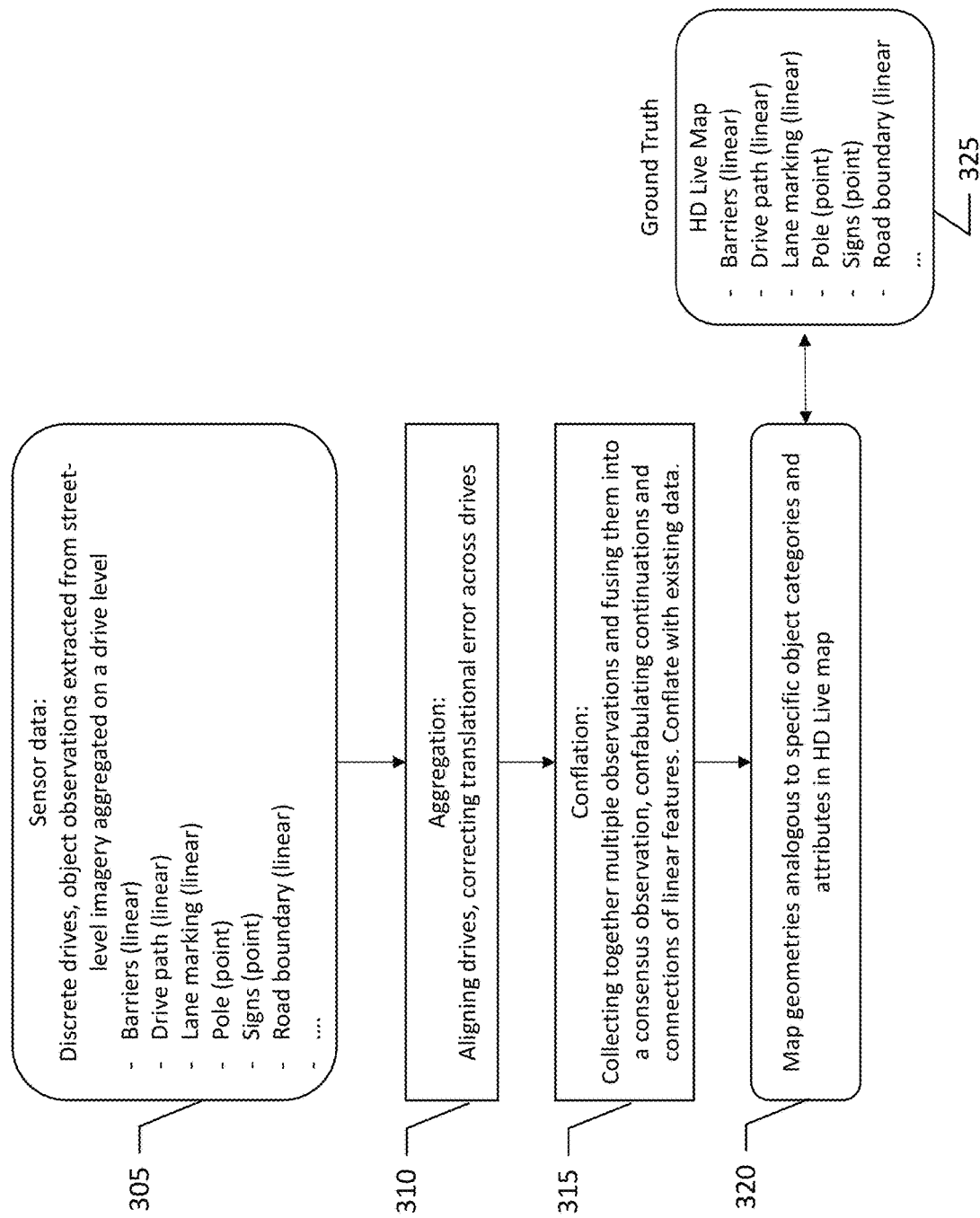
Figure 4:
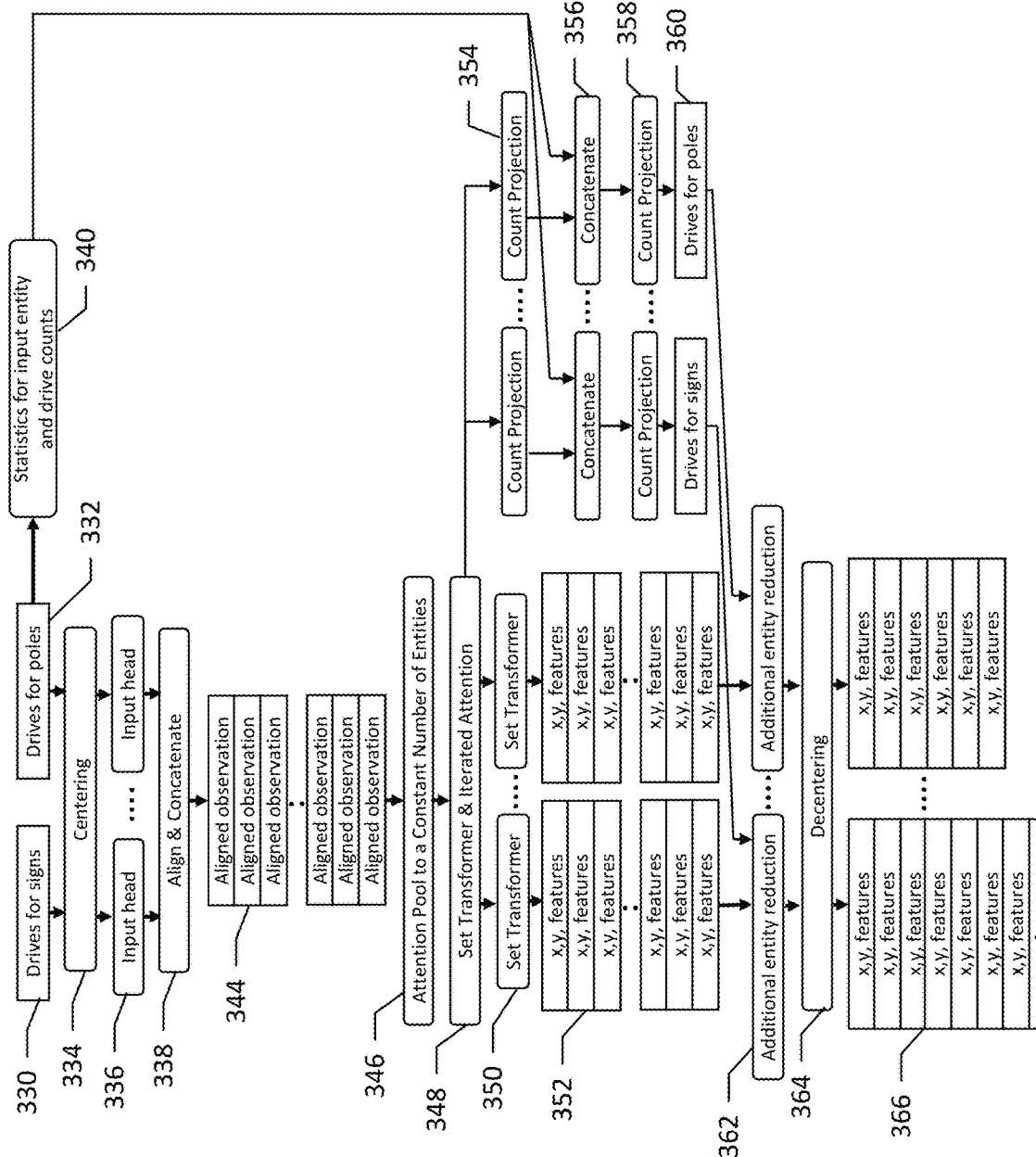
Figure 5:
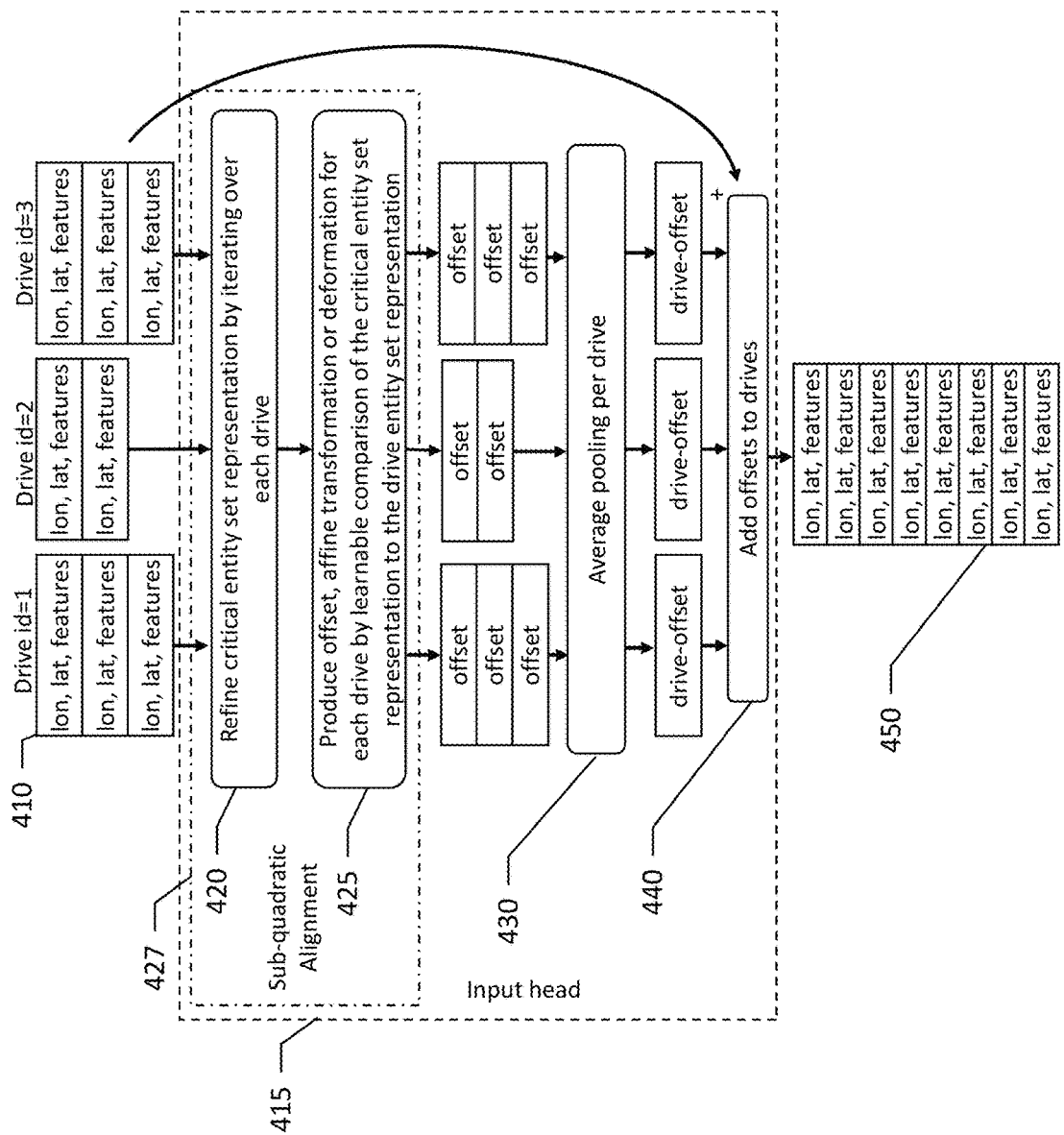
Figure 6:
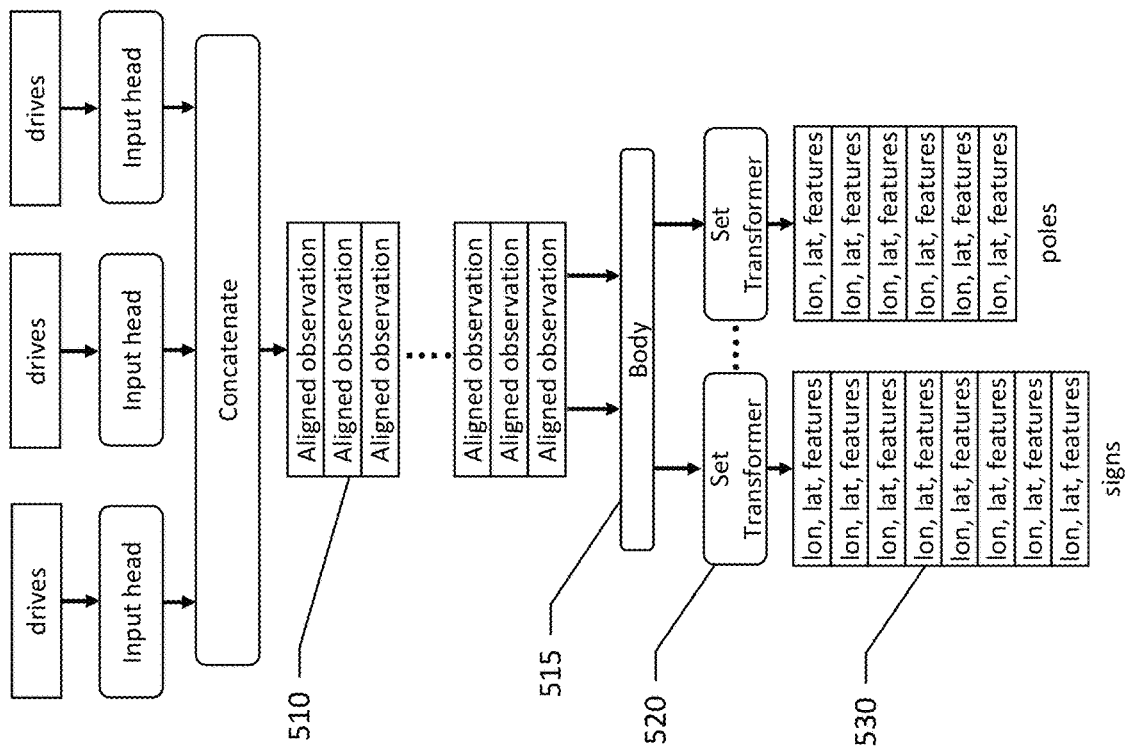
Figure 7:
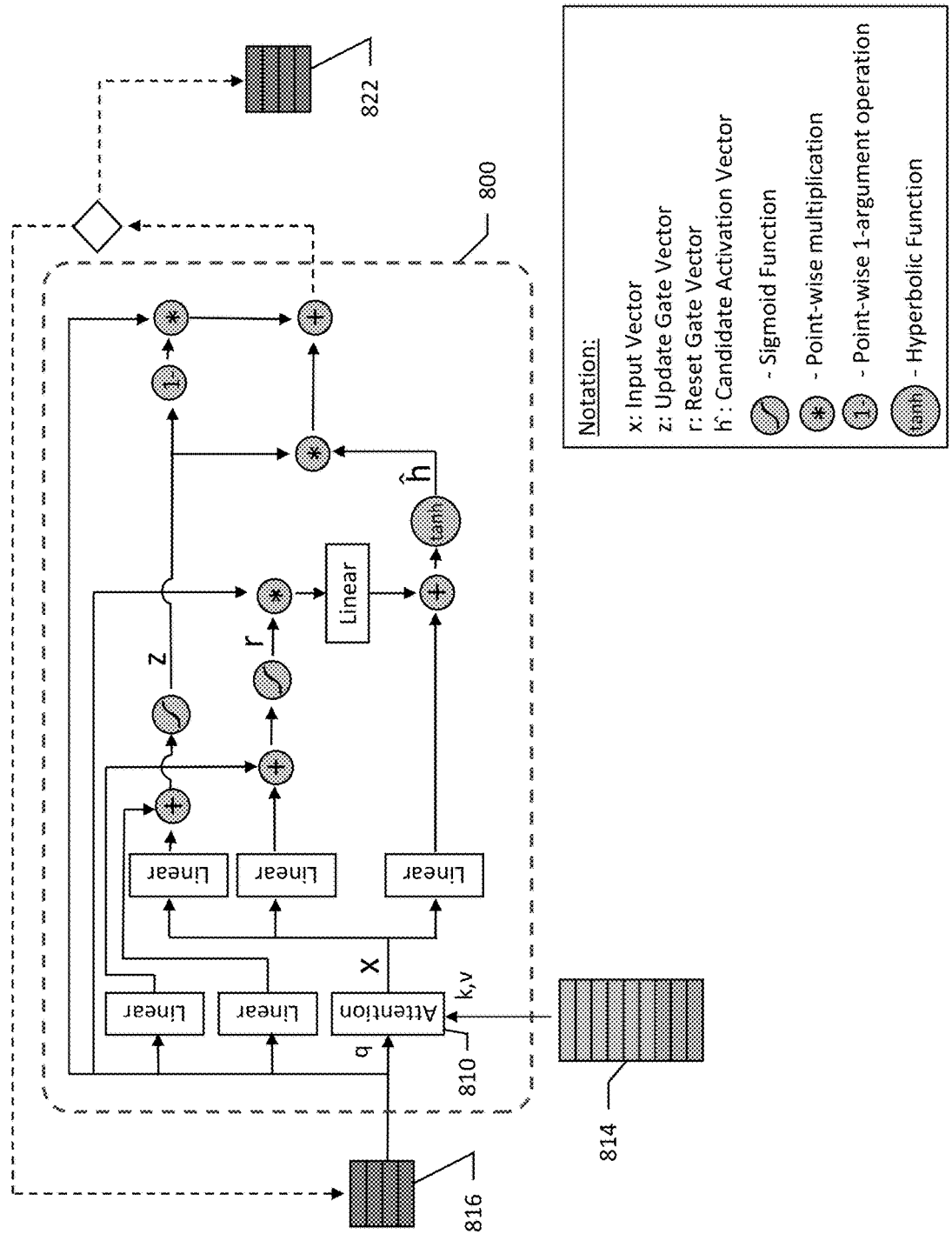
Figure 8:
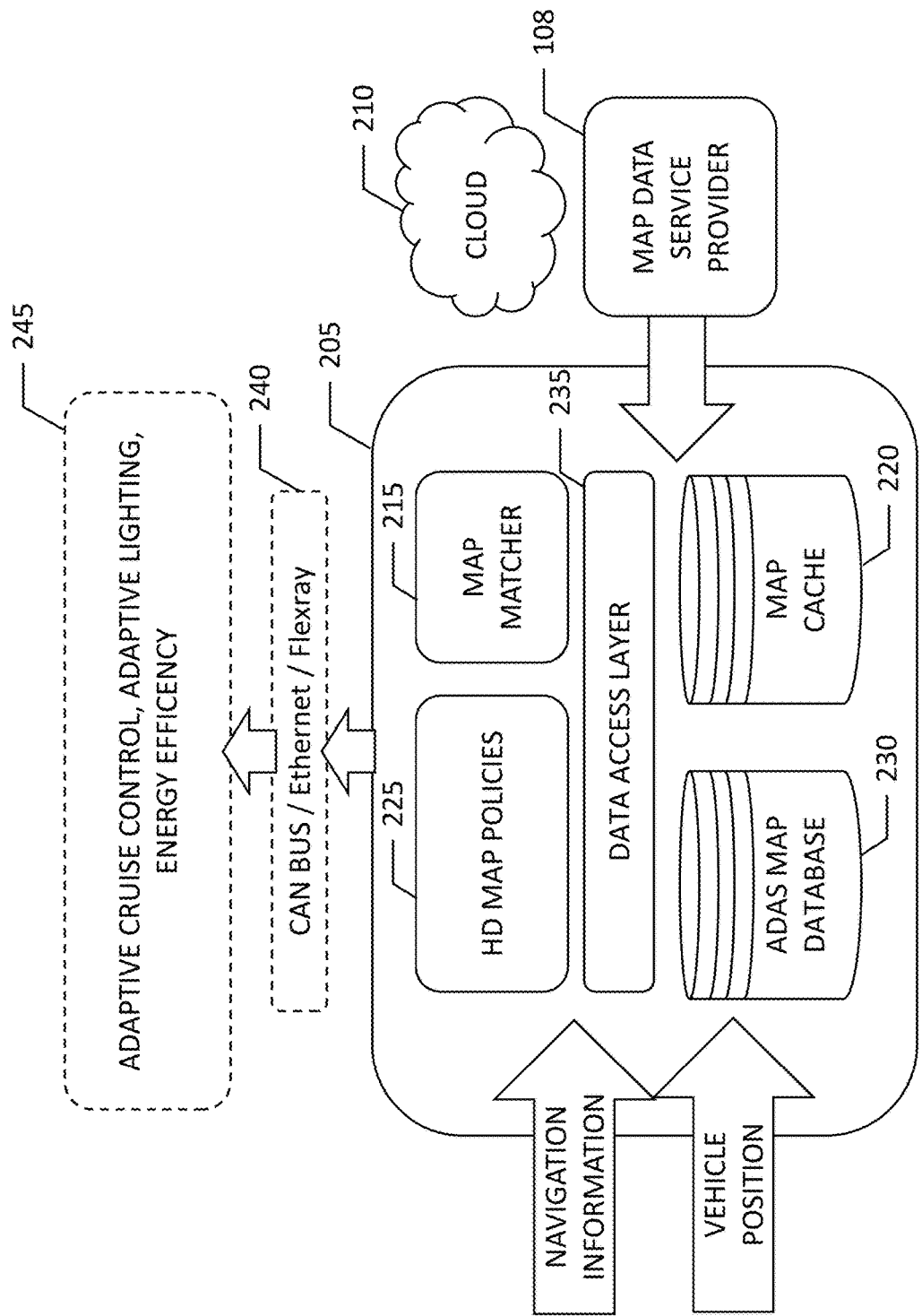
Figure 9:
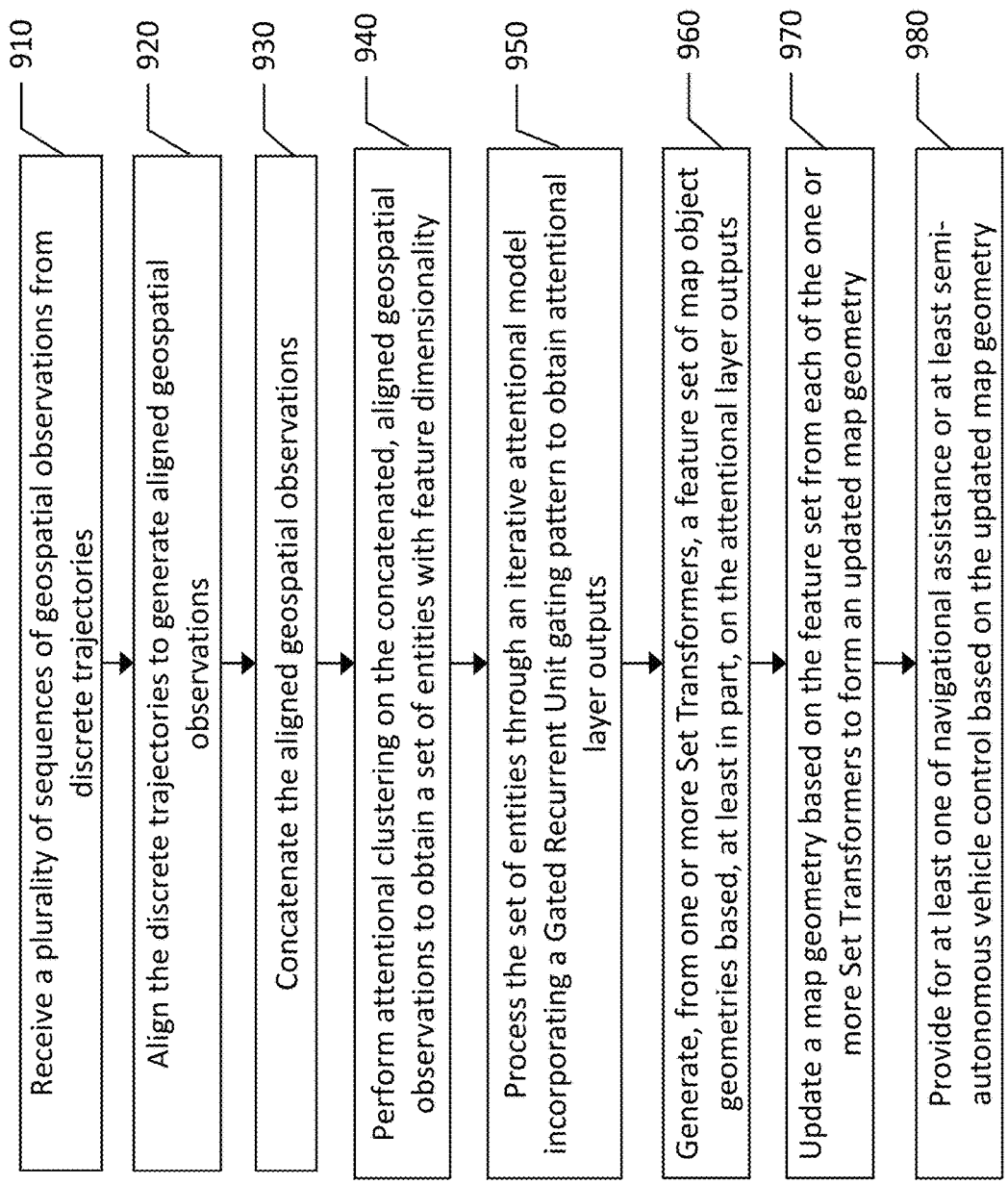

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system for iteratively establishing the position of a detected object according to an example embodiment of the present disclosure;

FIG. 3 illustrates the use of aggregated drives in map creation, verification, and healing according to an example embodiment of the present disclosure;

FIG. 4 is a flowchart of the operations of a drive conflation network according to an example embodiment of the present disclosure;

FIG. 5 is a flowchart of input head drive alignment according to an example embodiment of the present disclosure;

FIG. 6 is a flowchart of the operations of a drive conflation network according to another example embodiment of the present disclosure;

FIG. 7 illustrates the structure of a model for the architecture for a Gated Recurrent Unit combined with attentional layers to process unordered sets of entities iteratively according to an example embodiment of the present disclosure;

FIG. 8 is a block diagram of a system for implementing the methods described herein for learning to generate maps from raw geospatial observations from sensors traveling within an environment according to an example embodiment of the present disclosure; and FIG. 9 is a flowchart of operations for learning to generate maps from raw geospatial observations from sensors traveling within an environment according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present invention for the automatic generation of maps, and more particularly, to a system for learning to generate maps from raw geospatial observations from sensors traveling within an environment in an efficient and scalable manner. Embodiments employ the use of a sub-quadratic alignment head receiving discrete trajectories to process the geospatial observations of the trajectories in a computationally efficient manner that enables real-time processing of geospatial observations in a manner that allows streaming localization of an apparatus as it travels within a geographic area. Autonomous vehicles leverage sensor information relating to roads and objects and features proximate the roads to determine safe regions of a road to drive and to evaluate their surroundings as they traverse a road segment. Further, autonomous and semi-autonomous vehicles use high-definition map information to facilitate autonomous driving and to plan autonomous driving routes. These high-definition maps or HD maps are specifically designed and configured to facilitate autonomous and semi-autonomous vehicle control and may be able to replicate road segments virtually with the inclusion of accurately placed signs and other features or objects proximate a roadway.

HD maps have a high precision at resolutions that may be down to several centimeters that identify objects proximate a road segment, such as features of a road segment including lane widths, lane markings, traffic direction, speed limits, lane restrictions, etc. Autonomous and semi-autonomous vehicles use these HD maps to facilitate the autonomous control features, such as traveling within a lane of a road segment at a prescribed speed limit. Autonomous vehicles may also be equipped with a plurality of sensors to facilitate autonomous vehicle control. Sensors may include image sensors/cameras, Light Distancing and Ranging (LiDAR), Global Navigation Satellite Systems (GNSS) such as Global Positioning Systems (GPS), Galileo etc., Inertial Measurement Units (IMUs), or the like which may measure the surroundings of a vehicle and communicate information regarding the surroundings to a vehicle control module to process and adapt vehicle control accordingly.

HD maps may be generated and updated based on sensor data from sensor-equipped vehicles traveling along road segments of a road network. These vehicles may have various degrees of autonomy and may be equipped with a variety of different levels of sensors. Sensors from fully autonomous vehicles, for example, may be used to update map data or generate new map data in a form of crowd-sourced data from vehicles traveling along road segments. Sensor data received can be aggregated with other sensor data relating to the data captured by sensors to establish the accuracy of sensor data and to confirm the position, size, shape, etc. of features and objects along the road segment.

Deep neural network models processing map observations collected from one or more vehicles over multiple drives need to perform alignment between these drives by offsetting them to make them agree with each other. This reduces the positional variance between observations of the same entity or object across multiple different drives. This alignment is necessary because the relative position of observed entities can be somewhat inaccurate, but the global position of the observer vehicle tends to have a larger degree of uncertainty. Aligning observations across drives improves the accuracy of the data and the combinability of the data in map generation and healing. Further, embodiments described herein provide a scalable architecture for aligning geospatial observations across multiple drives in a manner that improves the efficiency of processing and improves the function of a computer itself in performing the alignment due to the improved efficiency and scalability. Still further, embodiments employing techniques described herein are capable of real-time processing of geospatial information to provide alignment and localization of a vehicle as it travels along road segments.

Embodiments described herein may broadly relate to computer vision when there is a need to establish the position of objects and features within an environment. For example, objects and features along a road segment may be detected through processing of sensor data. As the sensor data may be generated from a vehicle traveling along the road segment, the sensor data may not include object information from a perspective other than from along the road segment. As such, the degree to which sensor data may be relied upon for accurate positioning estimation of the object within three-dimensional space may be limited due to parallax effects between the relative sensor positions. Embodiments described herein provide a method of learning to generate maps (including map features and objects) from raw geospatial observations across multiple passes or drives from one or more sensor-equipped vehicles.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing advanced driver assistance features which may include a navigation system user interface. For example, the computing device may be an Advanced Driver Assistance System module (ADAS) which may at least partially control autonomous or semi-autonomous features of a vehicle. However, as embodiments described herein may optionally be used for map generation, map updating, and map accuracy confirmation, embodiments of the apparatus may be embodied or partially embodied as a mobile terminal, such as a personal digital assistant (PDA), mobile telephone, smart phone, personal navigation device, smart watch, tablet computer, camera or any combination of the aforementioned and other types of voice and text communications systems. In a preferred embodiment where some level of vehicle autonomy is involved, the apparatus 20 is embodied or partially embodied by an electronic control unit of a vehicle that supports safety-critical systems such as the powertrain (engine, transmission, electric drive motors, etc.), steering (e.g., steering assist or steer-by-wire), and braking (e.g., brake assist or brake-by-wire). Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped or associated, e.g., in communication, with any number of sensors 21, such as a global satellite navigation system (GNSS) such as the global positioning system (GPS), accelerometer, an image sensor, LiDAR, radar, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, a processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a graphics processing unit (GPU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA, GPUs (Graphics Processing Units) or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like).

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication and/or may alternatively support vehicle to vehicle or vehicle to infrastructure wireless links.

The apparatus 20 may support a mapping or navigation application so as to present maps or otherwise provide navigation or driver assistance. For example, the apparatus 20 may provide for display of a map and/or instructions for following a route within a network of roads via user interface 28. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LiDAR, ultrasonic and/or infrared sensors.

In example embodiments, a navigation system user interface may be provided to provide driver assistance to a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Identifying objects along road segments or road links that a vehicle may traverse may provide information useful to navigation and autonomous or semi-autonomous vehicle control by establishing barriers defining roadway width, identifying roadway curvature, or any boundary related details of the road links that may be traversed by the vehicle.

Embodiments of the present disclosure can be employed to provide navigational assistance to a human driver and/or to an autonomous or semi-autonomous vehicle. Navigational assistance can include information that helps guide operation of a vehicle within the environment and/or along a specific route (e.g., route guidance). Navigational assistance can include road sign identification and communication to a vehicle operator. For example, navigational assistance can include the identification of a speed limit sign and the speed limit governing a road segment along which a vehicle is traveling. This speed limit can be conveyed to an operator of the vehicle and the operator can be advised of deviation (above or below) from the speed limit.

A map service provider database may be used to provide driver assistance via a navigation system and/or through an ADAS having autonomous or semi-autonomous vehicle control features. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, an ADAS, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database, such as an HD map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate or complementary embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments.

The map database 110 of example embodiments may be generated from a plurality of different sources of data. For example, municipalities or transportation departments may provide map data relating to roadways, while geographic information survey systems may provide information regarding property and ownership of property within a geographic region. Further, data may be received identifying businesses at property locations and information related to the businesses such as hours of operation, services or products provided, contact information for the business, etc. Additional data may be stored in the map database such as traffic information, routing information, etc. This data may supplement the HD map data that provides an accurate depiction of a network of roads in the geographic region in a high level of detail including road geometries, features along the roads such as signs, etc. The data stored in the map database may be gathered from multiple different sources, and one source of data that may help keep the data in the map database fresh is map data provided by vehicles traveling along the road segments of the road network.

While municipalities and businesses may provide map data to a map database, this data may not be up-to-date, may be incomplete, or may be inaccurate. The ubiquity with which vehicles travel along road segments render those vehicles as opportunities to collect data related to the road segments provided the vehicles are equipped with some degree of sensor technology. A vehicle traveling along a road segment with only location sensing technology, such as a Global Navigation Satellite System like GPS, Galileo, etc., may provide data relating to the path of a road segment, while vehicles with more technologically advanced sensors may be able to provide additional information. Sensor data from image sensors or depth sensors such as LiDAR may provide details regarding the features of road segments including the position of signs along the road segment and the information contained on the signs. This data may be crowd sourced by map data service providers 108 to build more robust and reliable maps with a greater level of detail than previously available. Further, beyond building the maps in the map database 110, sensor data may be used to update map data or confirm existing map data to ensure the map database 110 is maintained and as up-to-date as possible. The accuracy and freshness of map data may be critical as vehicles become more advanced and autonomous control of vehicles becomes more ubiquitous as the map database 110 may provide information that facilitates control of a vehicle along a road segment.

Autonomous driving has become a focus of recent technology with recent advances in machine learning, computer vision, and computing power able to conduct real-time mapping and sensing of a vehicle's environment. Such an understanding of the environment enables autonomous driving in two distinct ways. Primarily, real-time sensing of the environment may provide information about potential obstacles, the behavior of others on the roadway, road information/warning signs, and areas that are navigable by the vehicle. An understanding of where other cars are and what they may do is critical for a vehicle (or apparatus 20) to safely plan a route. Further, vehicles must be able to avoid both static and dynamic obstacles, which may change presence and position in real-time. Autonomous vehicles must also have a semantic understanding of what areas are around them that are navigable and safe for driving. Maps, such as HD maps described above, of areas may exist with very high levels of granularity to help facilitate navigation for autonomous vehicles; however, exceptions will occur in which a vehicle may need to deviate from a roadway to avoid a collision or where a road's geometry or other map attributes (e.g., direction) have changed.

Another key to autonomous driving are vision techniques for localization with respect to a map of reference landmarks. This enables the understanding of a position and heading with respect to a roadway. On a coarse scale, navigation maps allow vehicles to know what roads to use to reach a particular destination. On a finer scale, maps allow vehicles to know what lanes to be in and when to make lane changes. This information is essential for planning an efficient and safe route as driving involves complex situations and maneuvers which need to be executed in a timely fashion, and often before they are visually obvious (e.g., a vehicle around a corner is stopped). Localization with respect to a map enables the incorporation of other real-time information into route planning. Such information can include traffic, areas with unsafe driving conditions (e.g., ice, weather, potholes, etc.) and temporary road changes, such as may be caused by construction.

Further, in order to implement full autonomy for a vehicle, the vehicle must be contextually aware in that the vehicle must be aware of the surroundings in terms of both dynamic conditions (e.g., weather, traffic, construction) and static conditions (e.g., road geometry, road signs, barriers, etc.). Embodiments described herein automatically generate and update maps and map features through a machine learning process that generates maps and map features from raw geospatial observations across multiple drives through an environment.

Automatic generation of maps is a difficult task typically solved through a sequential pipeline of discrete algorithmic steps, or in a very specific use case, for example, generating maps from overhead imagery such as satellite images. Automatically generating maps from observational geolocation is also difficult, where observational geolocation data is raw sensor data including observations of objects with one or more geo-positions and possibly other attributes such as category or size. Having a system for this task that can ingest multiple kinds of input geolocation data feeds and produce maps with multiple kinds of geometrical abstractions which can be trained end-to-end simplifies deployment of such a system and enables optimization of its performance across a whole pipeline. Traditional systems divide a process into discrete, separately tuned steps. Embodiments described herein provide a mechanism by which high quality maps are produced automatically from raw geospatial observations.

Currently, to address alignment offsets between datasets, handcrafted algorithms for drive alignment require explicit knowledge of all sorts of errors in the data collection. Simple clustering would lose information about which entities were observed across the same drive. Further, these algorithms are not scalable, and generally unsuitable for real-time or near real-time streaming of geospatial data for real-time localization of an apparatus.

Embodiments described herein include a feed-forward neural system built of components that can be in whole trained end-to-end. The system of example embodiments includes multiple input heads and multiple output heads, and information is exchanged between these in a shared "body" of the system. This system produces output in the form of features of a map that are accurately located within the mapped environment. A clustering-like process using self-attentional layers in neural networks would require a time complexity that precludes scalability as all entities would attend to all other entities. Embodiments described herein use a structure where iterated attention is used to first refine the representation of the true alignment of critical entities across all drives and entity observations instead of using self-attentional layers. This representation can further be employed to attend it to each drive entity, producing an offset representation for each drive. The offset representation can then be applied to the drive observations, which produces aligned entity observations for further use in the model or pipeline. While iterative self-attentional layers are effective and scalable, embodiments described herein further improve upon this process by use of a gating structure from a Gated Recurrent Unit (GRU) combined with attentional layers to process unordered sets of entities iteratively with good convergence and accuracy characteristics. The process of example embodiments enables scalability through efficiency of processing of the drive or trajectory data. This improvement in efficiency improves the function of a computer itself when generating map geometries as described herein. Further, as noted above, embodiments are able to be employed in real-time or near real-time for localization of an apparatus, such as a vehicle, as it travels within an environment.

According to certain embodiments of the present disclosure, two sequential phases are used for an entity alignment head of a model. These phases include refining the summary entity set representation by iterating over each drive (e.g., each set of observed geolocational data). The next phase produces an offset, affine transformation, or deformation for each drive by learnable comparison of the summary entity set representation to the drive entity set. The summary entity set is a set of vector embeddings. Embodiments described herein are distinct from bottleneck architectures where the latent model representation resides in the middle in the form of a vector structure/tensor. According to embodiments described herein, a set of vectors is used without an inherent order between elements, presuming permutational symmetry. This set of vectors is represented in memory as a sequence of vectors.

A model of example embodiments includes an input head of a neural network that reads in sequences of geospatial observations from discrete drives and is structured to be able to learn to align these drives before proceeding further in the computational graph. In a neural network, attention is a technique that approximates cognitive attention of a human. The technical effect focuses attention of the neural network on the most relevant part or parts of the input data, while minimizing the importance of the remaining input data. The input data to the neural network includes data from individual vehicles that have traveled along road segments in a network together with observations from sensor data from these drives. The neural network clustering aligns drives along road segments within a road network.

The output heads can employ Chamfer loss to produce geolocation abstractions which correspond to map elements. Since this loss is robust to cardinality mismatch, the outputs will be filtered to remove duplicate output elements that in reality depict only a single map element. It is desirable for the loss to be invariant to the cardinality of the entities, such that multiple model output points can represent a single target output point without a loss penalty. This is because in practical conflation cases, it is unknown how many output entities there are, though it is reasonable to assume that there is an upper limit of ground truth entities to predict of based on a predefined number of input points. The Chamfer loss function is well suited to embodiments described herein, and different regularization and auxiliary components can be added to the loss with the performances of different baselines compared with the unmodified Chamfer loss on a test set of data. The modified Chamfer distance formula employed herein is:

$$CD(S_1, S_2) = \frac{1}{|S_1|} \sum_{x \in S_1} \min_{y \in S_2} \|x-y\|_2^2 + \frac{1}{|S_2|} \sum_{x \in S_2} \min_{y \in S_1} \|x-y\|_2^2$$

$$|S_1| > 0, |S_2| > 0$$

Zero distance between points does not ensure that they correspond to the same object (e.g., the items may not be identical as in the identity of indiscernables) and the triangle inequality does not hold, such that the modified Chamfer distance formula above is a pre-metric. The modified Chamfer distance formula can be characterized as bi-directional mean squared Chamfer distance.

The Chamfer distance has two parts: the precision part and the recall part. Each item in the ground truth set of entities is matched to the closest entity (minimum distance) in the model output, and vice versa, summing the minimum squared differences each way and normalizing by the set sizes. The distance to any set to itself is zero. The modified Chamfer distance is insensitive to cardinalities of points in the data sets, such that several points in the model output can match to a single point in the ground truth. The computational complexity ($O(n^2)$) is an improvement over the Hungarian loss function that uses one-to-one responsibility matching with a higher complexity ($O(n^3)$).

The entity-wise distance inside the sums of the modified Chamfer distance formula above can be any distance function, such as Euclidean distance, L2 norm. This model can learn to produce accurate maps for examples of heterogeneous geospatial observations for regions of relatively large size. To scale up the process, the observations can be processed in a tile-by-tile manner to produce corresponding map elements similarly in tile-by-tile output. Map tiles may include sections of a mapped region that are divided into tiles, where the tiles can be of any size that is suitable for the desired use.

FIG. 3 illustrates the use of aggregated drives in map creation, verification, and healing. As shown, sensor data is obtained at 305 from discrete drives with object observations extracted from street level imagery aggregated on a drive level. Such data collection may be collected through a variety of sensor types, such as image sensors or cameras, LiDAR (Light Distancing and Ranging) sensors, sonic sensors, or the like. One example of a camera sensor is a Mobileye™ camera sensor that identifies objects in imagery and uses bounding boxes to identify objects and their relative position along the trajectory of a vehicle. The objects sensed and identified may include linear objects (e.g., barriers, drive paths, lane markings, road boundaries, etc.) and point objects (signs, poles, etc.). Point objects can be identified with a two-dimensional floating point vector of coordinates (e.g., x,y) that can represent distance, such as meters, displaced from a center of the sample or capture position. A linear object can be identified with coordinate pairs, such as (x1, y1, x2, y2).

Aggregation of the data is performed as shown at 310 including aligning drives and correcting translational error across drives. Conflation occurs at 315 where multiple observations are collected together and fused into a consensus observation, confabulating continuations and connections of linear features which are conflated with existing data. At 320, geometries analogous to specific object categories and attributes are mapped in an HD map. These can be compared against ground truth features 325 from the HD map for verification and healing.

According to an example embodiment of the present invention, an input head, illustrated in FIG. 4, reads in observational data as tuples, such as in the form of a drive identifier (a unique number assigned to each drive), longitude, latitude, features, etc. According to the illustrated embodiment, drives including object observations are conducted with sign objects identified in drives for signs 330 and pole objects identified in drives for poles 332. These objects are centered at 334 and used as input heads 336 for observational data. The drives for signs 330 and drives for poles 332 further define statistics for input entity and drive counts 340. The statistics for input entity and drive counts include summarizing vectors of how many drives there were, how many signs, how many poles, how many lane segments, etc. These objects identified can be divided by the number of drives to obtain an average number of objects of different categories observed on a per-drive basis.

Each drive can include a structured list of sets of object observations. A first set can include point objects (e.g., signs) observed on the drive, a second set can include line objects (e.g., road lines or barriers), etc. These observations from each drive are compiled into a list of drives or discrete trajectories for the input sample. Each drive featured in a particular geographic region of a point and radius includes observations in such a structure. Drives can be iterated over, features can be iterated over, and ultimately the observation items can be iterated over. Drives can be unordered, but features are ordered according to feature input type. Features such as point objects, line objects, etc. Observations from drives generally include latitude and longitude coordinates for point objects, and latitude, longitude tuples for linear features.

The input heads 336 provide the observational data for alignment and concatenation at 336 to obtain aligned observations 344 of the objects observed in the drives. The aligned observations 344 are provided to an attention layer 346. The attentional layer 346 with queries coming from an inducing vector performs a sort-analogous operation when each query attends to most similar entities in the input. The attentional outputs are in the same order as the inducing vector even if the input entities of the aligned observations are unordered. The attention layer performs attention pooling to the constant number of entities. The attentional outputs are provided to a Set Transformer with iterated attention is performed at 348. This weights the significance of the input data, and outputs a count projection of observed objects at 354, where a count projection of signs observed, and a count projection of poles observed are estimated.

Based on the statistics for input entity and drive counts at 340, object counts are established from the raw drive observation data and both the count projections of 354 and count projections from the raw data are provided for concatenation at 356. A new count projection is established at 358 where the number of signs observed along a particular road segment and a number of poles observed along a road segment are output from 360. The attentional layer outputs are processed through Set Transformers at 350 differentially weighting the significance of each part of the input data to produce observations 352 in the form of location "x" and "y" (e.g., latitude and longitude) and features of the observation. These observations are provided for additional entity reduction at 362 along with the count projections for the different object types (e.g., signs and poles) to identify the number of outputs from the machine learning model. The outputs are unknown initially such that the model does not produce a fixed number of outputs, but a number of outputs established from the count projections 354 and the statistics for input entity and drive counts at 340. Decentering of the observations occurs at 364 and the observational outputs are established at 366.

An example embodiment of the input heads 336 of the model of FIG. 4 is shown in FIG. 5. According to the illustrated embodiment of FIG. 5 of the present disclosure, an input head 415 reads in observational data as tuples, such as in the form of a drive identifier (a unique number assigned to each drive), longitude, latitude, features, etc. This is illustrated as block 410, where different drives provide one or more observations with at least the longitude, latitude, and features. Each drive can include a structured list of sets of object observations. A first set can include point objects (e.g., signs) observed on the drive, a second set can include line objects (e.g., road lines or barriers), etc. These observations from each drive are compiled into a list of drives or discrete trajectories for the input sample. Each drive featured in a particular geographic region of a point and radius includes observations in such a structure. Drives can be iterated over, features can be iterated over, and ultimately the observation items can be iterated over. Drives can be unordered, but features are ordered according to feature input type. Features such as point objects, line objects, etc. Observations from drives generally include latitude and longitude coordinates for point objects, and latitude, longitude tuples for linear features.

To refine the summary entity set representation by iterating over each drive, as shown at block 420 of alignment head 427, queries are initialized with a specific number of values. A multi-head attention layer is used to attend with these queries to a set of all of the entity representations observed in a given input sample by a single drive otherwise referred to herein as a discrete trajectory. The attention result is a refined summary entity set of the same cardinality as the queries. This is performed for each drive (e.g., Drive id=1, Drive id=2, and Drive id=3 shown at block 410), with the produced summary entity set used as queries. If there are no more drives in the sample, the summary entity set is forwarded to the next phase shown at block 425 where offsets are produced and applied.

At block 425 of FIG. 5, the summary entity set from block 420 is used in a multi-head attention layer to attend to entities observed in a single drive in the input sample. This attention produces an offset, affine transformation, or deformation representation, for this drive to match to the summary entity set. The transformation representation is applied to the entities observed in that drive in the input sample. If there are more drives, the process is repeated with the next drive being used as the input sample. If there are no more drives, the model has produced aligned entity representations across multiple observation drives.

In attention, each point in the input attends to all close by geolocation input tuples, minus itself. This attention produces a representation for displacement or offset, as it in principle defines a general learnable function which, for each point, can consider its neighborhood in the input data. This offset representation for each point is averaged for each unique drive identifier (drive_id) in the input at block 430, and this averaged displacement representation for each drive is added to all the observational geolocations for each drive at block 440. Thus, this offset representation is able to learn to correct for translational offset and find a consensus between drives using one kind of amortized, learnable clustering. Offsets are essentially a simple translation operation, such as a rigid transformation, affine transformation, or a more complex deformation. The offset is a vector addition to input coordinates with units in the input coordinate system. Embodiments can use Azimuthal Equidistant Projection, centered on a small sample area on the ground. This renders the input coordinates to be in approximate Euclidian distance (e.g., meters). Azimuthal Equidistant Projection is a projection which is parameterized by a point on the globe, and essentially flattens the globe around that point such that around that point is Euclidean and equidistant. The described system also works for latitude-longitude coordinates, where the distances would be in degrees, but to prevent distortions, embodiments can be centered to the sample area.

The translated, offset drives are concatenated together and the drive identifiers are dropped at block 450. Subsequent layers will obtain drive-aligned observational geospatial representations which can combine with similar drive-aligned observational geolocations from other input heads and produce embeddings which are protected by separate output heads to different kinds of map representations for the generated map. A Set Transformer may be used to learn a function from these aligned drive representations including a set of multiple geospatial entities to different outputs which are again a set of geospatial entities. The Set Transformer is defined in *Set Transformer: A framework for Attention-based Permutation-Invariant Neural Networks* (Lee, 2019). The Set Transformer is a powerful neural component that is able to learn very complex interactions between unordered sets of entities. FIG. 6 illustrates the Set Transformer at block 520 receiving the output at of the input head drive alignment of FIG. 5, with the aligned observations at block 510 stemming from the translated drives that are concatenated together at 450 in FIG. 5. The body 515 receives the aligned observations and maps a set of entities to another set of entities. The body outputs are structured as a set of entities with some feature dimensionality. The number of body outputs is constant and corresponds roughly to the maximum number of entities the model is capable of outputting. The Set Transformer(s) at block 520 are output heads receiving input from the body 515. Ultimately the output heads of Set Transformer(s) of block 520 will project back to geometric spaces which, according to embodiments described herein, are two or three dimensional map entities.

This model body 515 outputs a static number of entities for each output feature type. When integrating this model to a pipeline producing map entities, further adaptation is required to optionally derive delta changes to a previous map, or to collapse duplicate model output entities into a single model output entity using heuristics. One example embodiment heuristic is adding a separate model output head which regresses to the count of ground truth entities for each output feature type, and this output can be used as K in K-means clustering. The model body 515 can be implemented by a single Set Transformer, by an iterated attention model, or by a concatenation based combination of the two.

In the structure illustrated in FIG. 6, all of the output heads are Set Transformers, which take in sets of entity embeddings and produce their own map geometries from those as geospatial object observations at 530. One output producing road markings, for example, reads in the representation of the observed reality of objects classified as road markings from previous layers, attends to entities it has learned to be relevant for road markings, and produces estimates for the road markings in the area. Map geometries generated by the Set Transformers include objects, with each Set Transformer generating a specific type of object. For example, embodiments may include Set Transformers for road markings (e.g., lane lines), road signs, road boundaries (e.g., curbs), light poles, and other object classifications relevant to travel along a road segment.

According to an example embodiment, these input and output data sets are batched into sets of multiple region examples of input and corresponding ground truth. Since each example in the batch can vary in the number of geospatial observations it contains, the second dimension in the dataset varies in size, and does not form a well-behaved tensor. For training in batches, embodiments may employ RaggedTensors or a separate mask tensor which designates which inputs and ground truths are valid to pad the second entity dimension to a constant size.

A drive alignment head based on self-attention across all input entities is quadratic in operations and memory complexity. Such an embodiment is generally not scalable and reduces flexibility of such an alignment head. Embodiments described herein include a trainable drive alignment head that can perform the same tasks without self-attention, such as using iterated attention over drives. Such a model has the benefit of being more general and extensible to other data inputs. The alignment head 427 of FIG. 5 provides a sub-quadratic learnable alignment based on iterated attention, becoming sub-quadratic and thus scalable by iterating over drives and proving substantially more efficient.

The drive alignment head model of example embodiments is able to perform approximate clustering of corresponding inputs across multiple drives. The model is sub-quadratic such that self-attention across all inputs is not used. Instead of self-attention, embodiments use iterated attention (Perceiver) so that each iteration attends to entities from a different drive. The weights of these attentional rounds are naturally shared. Intuitively, such iteration should produce "seed" representations for final aligned entities, which attend to the entities in the next drive, which can tune and improve these seed representations which can be thought of as cluster centers.

Each drive is iteratively processed, refining some embedding during the processing. The embedding is shared across all features such that alignment correction for some feature can affect the same for other features. One each iteration, the queries are updated by assignment and aggregator by sum. The embeddings are combined by concatenating all features together as entities to attend. The attention layers all should have a skip or residual connection from queries to outputs. Each attentional block attends two ways to perform bi-directional matching between two entity sets, to migrate the inherent tendency of the attentional layer to filter out entities and end up in a mode collapse. The resulting "Feature summary embedding across all drives and features" can be used as the model body input as such, or per-drive offset alignment can be derived from combining that to entities in each drive again.

As noted above, iterative attention performs well; however this may not be suitable for all implementations. Iterative attention is iterated on the same input data rather than over a set or sequence of observation sets. While iterative attention performs well, embodiments described herein use a gating structure from a Gated Recurrent Unit (GRU) combined with attentional layers to process unordered sets of entities iteratively. This produces good convergence and accuracy, while also being able to be implemented in real-time or near real-time embodiments that facilitate localization of an apparatus such as a vehicle as it travels along a road segment.

The Set Transformer with iterative attention body of FIG. 4, shown at element 348, is iterated on the same input data. However, further embodiments described herein use recurrent model gating structures to provide a model that iterates over a set or sequence of observation sets. Rather than using plain attentional layers in the iterative model in an entity summarization step, it is possible to use a gating structure from a Gated Recurrent Unit (GRU) combined with attentional layers to process unordered sets of entities iteratively with good convergence and accuracy characteristics. This hybridized attentional GRU improves upon the self-attentional model through a simpler architecture and improved processing efficiency. To implement the improved model, the Set Transformer and Iterated Attention body of FIG. 4 shown as 348 is replaced with a GRU attention block, detailed in FIG. 7.

FIG. 7 illustrates an example embodiment of a hybrid attentional GRU Attention model 800 that can replace the Set Transformer with iterative attention body of FIG. 4 to improve the efficiency of drive alignment and the generation of feature summary embedding across all drives and features used by the attentional model to produce drive offsets more efficiently and optionally for use in real-time or near real-time alignment of drive observations.

The inducing queries 816 are received into the attention layer 810. The inducing queries are initialized as random but trainable. The inputs 814, from the attention pooling, are processed through a non-linear projection to high dimensional space at 812 are processed by the attention layer 810. Path "x" represents the input vector, while path "z" represents the update gate vector and path "r" represents the reset gate vector. Path "ĥ" represents the candidate activation vector. The conventional GRU equations are applied in the architecture depicted in FIG. 9 in a novel context. However, since the gating pattern is consistent with conventional GRUs, the following GRU equations apply:

$$z_t = \sigma_g(W_z x_t + U_z h_{t-1} + b_z)$$

$$r_t = \sigma_g(W_r x_t + U_r h_{t-1} b + b_r)$$

$$\hat{h}_t = \phi_h(W_h x_t + U_h(r_t \odot h_{t-1}) + b_h)$$

$$h_t = (1-z_t) \odot h_{t-1} + z_t \odot \hat{h}_t$$

where: $x_t$ is the input vector, $h_t$ is the output vector, $\hat{h}_t$ is the candidate activation vector, $z_t$ is the update gate vector, $r_t$ is the reset gate vector, W, U are parameter matrices and b is a parameter vector. The output of the GRU attention model illustrated in FIG. 7 are the iterated attention outputs received by the Set Transformers 350 shown in FIG. 4.

Conventional GRUs are implemented independently and individually. However, embodiments described herein employs GRU gating patterns in a manner that is equivalent to having n instances of GRU gating modules in parallel, each processing its own stream of values as multiplexed by the attentional layer based on the inducing vector which iteratively updates. The inducing vector is used as the set of GRU hidden states, one inducing vector for each GRU module.

Inducing vectors, as described herein, relate to an inducing tensor which is the structure which describes a sequence of inducing vectors. Embodiments of the present disclosure use a sequence of inducing vectors which essentially is a tensor shaped as [number of entities to produce, length of inducing vector]. Replacing the original Set Transformer coupled with Iterated Attention with one that incorporates the GRU gating pattern into an iterative attention model improves performance as it is simpler in structure and can thus be scaled more effectively. The Set Transformer—Iterated Attention body in the overall Drive Conflation model needs to form a function from sets of entities to sets of entities. In such contexts, Set Transformers are state-of-the-art. Combining Set Transformers with the Iterated Attention body combined by concatenating their outputs together provides some degree of improvement; however, using an iterated attention body that incorporates the gating pattern from GRUs improves the trainability and accuracy of the overall models in automatic map-making use cases.

The alignment head of the model described above can be trained end-to-end by only using the overall model loss as the training signal. However, this can often lead to too-slow convergence. Hence certain auxiliary losses are provided herein to improve training. An offset loss is used as the squared sum of all offsets, or in the case of affine transformations or deformations, an analogous loss which measures the cumulative deviation by all the transformations of drives. The training process tends to this minimum (in practice, zero) which means that the sum of offsets applied to drives should center to zero. Said differently, if one drive is adjusted west, another drive should be adjusted east to compensate. This loss keeps the transformations centered. Consensus loss uses Chamfer distance or similar distance metric between aligned entities of a drive to the entities of other drives. Minimizing this distance causes the alignment transformations to produce tight clusters of aligned transformations. Feature alignment loss provides that if the input entity types are one-to-one mapped to ground truth, for these entity types can allow for adding another loss, which measures the deviation of aligned input entities from the respective ground truth. Chamfer loss can be used to measure such a deviation.

The alignment head 427 can further be optimized. Consensus loss can be computed only for a low number of pairs of drives in the input, not exhaustively, for all combinations of drives. Iterative attention memory use grows linearly in backpropagation such that it is possible to mark all but a set number of drives in forward pass as gradients disabled, such that internal activations are not stored for these drives. For example, ten iterative steps or ten drives can be iterated with gradients enabled, such that only these will affect the backward pass training, thus saving memory and improving the efficiency of the processing.

As described above, HD maps may be instrumental in facilitating autonomous vehicle control. Building the HD maps may rely on sensor data received from crowd sourced detectors including image sensors and depth detectors (e.g., LiDAR) from vehicles traveling along the network of roads that is mapped. The sensor data that is received is processed to identify objects and features in the sensor data to properly build and update the HD maps, and to facilitate autonomous control of the vehicle generating the sensed data. Embodiments described herein provide a method for learning to generate maps from raw geospatial observations from such crowd-sourced sensor data from vehicles traveling within an environment.

Autonomous vehicles or vehicles with some level of autonomous controls provide some degree of vehicle control that was previously performed by a person driving a vehicle. Removing some or all of the responsibilities of driving from a person and automating those responsibilities requires a high degree of confidence in performing those responsibilities in a manner at least as good as a human driver. For example, maintaining a vehicle's position within a lane by a human involves steering the vehicle between observed lane markings and determining a lane when lane markings are faint, absent, or not visible due to weather (e.g., heavy rain, snow, bright sunlight, etc.). A vehicle with autonomous capability to keep the vehicle within a lane as it travels along a road segment must also be able to identify the lane based on the lane markings or other features that are observable. As such, the autonomous vehicle must be equipped with sensors sufficient to observe road features, and a controller that is capable of processing the signals from the sensors observing the road features, interpret those signals, and provide vehicle control to maintain the lane position of the vehicle based on the sensor data.

Maintaining lane position is merely one illustrative example of a function of autonomous or semi-autonomous vehicles that demonstrates the sensor level and complexity of autonomous driving. However, autonomous vehicle capabilities, particularly in fully autonomous vehicles, must be capable of performing all driving functions. As such, the vehicles must be equipped with sensor packages that enable the functionality in a safe manner.

Beyond sensors on a vehicle, autonomous and semi-autonomous vehicles may use HD maps to help navigate and to control a vehicle along its path. These HD maps may provide road geometry, lane geometry, road segment restrictions (e.g., speed limits), lane restrictions (e.g., turn-only lanes), and any other information that may be related to the road segments of a road network. Further, HD maps may be dynamic and may receive updates periodically from map services providers which may be informed by vehicles traveling along the road segments with sensor packages able to identify and update the HD maps, in addition to mapping objects and road features that may not previously be known to the HD maps.

According to example embodiments described herein, the role of HD maps in facilitating autonomous or semi-autonomous vehicle control may include crowd-sourced building of the maps to identify and confirm features of the maps and their respective locations. In the context of map-making, the features from the environment may be detected by a vehicle traveling along a road segment and consolidated to form a representation of the actual real-world environment in the form of a map. Embodiments described herein include a method, apparatus, and computer program product to automatically generate maps including map geometries with objects defined therein that may be used as HD maps for autonomous vehicle control and for navigational assistance.

Vehicles traveling along a road segment may be equipped with sensors, such as sensors 21 of apparatus 20 of FIG. 1, where the sensors may include image sensors and distance sensors (e.g., LiDAR sensor or other three-dimensional sensor). These sensors may be used to detect features of an environment to facilitate autonomous and semi-autonomous driving. The sensors may be part of a detection module or perception module which may feature a plurality of sensors to obtain a full interpretation of the environment of the module and the vehicle associated therewith.

FIG. 8 illustrates an example embodiment of architecture specifically configured for implementing embodiments described herein. The illustrated embodiment of FIG. 8 may be vehicle-based, where sensor data is obtained from sensors of a vehicle traveling along a road segment. The location of the collected sensor data along the road segment may be determined through location determination using GPS or other positioning means and correlated to map data of map data service provider 108. As illustrated, the architecture includes a map data service provider 108 that provides map data (e.g., HD maps and policies associated with road links within the map) to the Advanced Driver Assistance System (ADAS) 205, which may be vehicle-based or server based depending upon the application. The map data service provider may be a cloud-based 210 service. The ADAS receives navigation information and vehicle position and may use that information to map-match 215 the position to a road link on a map of the mapped network of roads stored in the map cache 220. This link or segment, along with the direction of travel, may be used to establish which HD map policies are applicable to the vehicle associated with the ADAS, including sensor capability information, autonomous functionality information, etc. Accordingly, policies for the vehicle are established based on the current location and the environmental conditions (e.g., traffic, time of day, weather). The HD map policies associated with the road segment specific to the vehicle are provided to the vehicle control, such as via the CAN (computer area network) BUS (or Ethernet or Flexray) 240 to the electronic control unit (ECU) 245 of the vehicle to implement HD map policies, such as various forms of autonomous or assisted driving, or navigation assistance.

A vehicle traveling along a road segment may receive sensor data from a plurality of sensors used to capture data relating to the surrounding environment, such as the position of an object (e.g., a sign, pole, lane markings, road barriers, etc.) relative to a vehicle and the road segment. These geospatial observations may be generated along discrete trajectories that are aligned and used to definitively identify the geo-location of objects within a map database. The automatic building and updating of map geometries as described herein can produce accurate HD maps with great efficiency.

FIG. 9 illustrates a flowchart depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 9 is a flowchart of a method for learning to generate maps from raw geospatial observations from sensors traveling within an environment. As shown, at 910, a plurality of sequences of geospatial observations are received from discrete trajectories. These discrete trajectories or drives come from apparatuses, such as vehicles or mobile devices, traveling within a geographic region. The discrete trajectories are aligned at 920 to generate aligned geospatial observations. The aligned geospatial observations are concatenated at 930. Attentional clustering is performed at 940 on the concatenated, aligned geospatial observations to obtain a set of entities with feature dimensionality. The set of entities are processed at 950 through an iterative attentional model incorporating a Gated Recurrent Unit gating pattern to obtain attentional layer outputs. A feature set of map object geometries is generated at 960 from one or more Set Transformers based, at least in part, on the attentional layer outputs. A map geometry is updated at 970 based on the feature set from each of the one or more Set Transformers to form an updated map geometry. At 980, at least one of navigational assistance or at least semi-autonomous vehicle control is used based on the updated map geometry.

In an example embodiment, an apparatus for performing the method of FIG. 9 above may comprise a processor (e.g., the processor 24) configured to perform some or each of the operations (910-980) described above. The processor may, for example, be configured to perform the operations (910-980) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 910-980 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:

receive a plurality of sequences of geospatial observations from discrete trajectories;

align the discrete trajectories to generate aligned geospatial observations;

concatenate the aligned geospatial observations;

perform attentional clustering on the concatenated, aligned geospatial observations to obtain a set of entities with feature dimensionality;

process the set of entities through an iterative attentional model incorporating a Gated Recurrent Unit (GRU) gating pattern to obtain attentional layer outputs, wherein the gating pattern is equivalent to multiple GRU gating modules in parallel, each processing its own stream of values as multiplexed by an attentional layer based on an inducing vector that iteratively updates;

generate, from one or more Set Transformers, a feature set of map object geometries based, at least in part, on the attentional layer outputs;

update a map geometry based on the feature set from each of the one or more Set Transformers to form an updated map geometry;

update a map database to include the map geometry including the map object geometries from the geospatial observations; and provide for at least one of navigational assistance or at least semi-autonomous vehicle control based on the updated map geometry.

2. The apparatus according to claim 1, wherein each of the one or more Set Transformers correspond to an object type, wherein the feature set from each of the one or more Set Transformers comprises a set of map object geometries of the object type.

3. The apparatus according to claim 1, wherein the feature set comprises location information associated with a respective map object geometry.

4. The apparatus according to claim 1, wherein the map object geometries comprise point objects and linear objects, wherein point objects comprise at least one of signs or poles, and wherein linear objects comprise at least one of road markings or road boundaries.

5. The apparatus according to claim 4, wherein the point objects and linear objects from the geospatial observations are used to facilitate autonomous vehicle control.

6. The apparatus according to claim 1, wherein causing the apparatus to align the discrete trajectories to generate the aligned geospatial observations comprises causing the apparatus to apply a drive offset to each of the discrete trajectories to generate the aligned geospatial observations.

7. The apparatus according to claim 1, wherein the plurality of sequences of geospatial observations from discrete trajectories include unique trajectory identifiers for each discrete trajectory, wherein causing the apparatus to concatenate the aligned geospatial observations comprises causing the apparatus to remove the unique trajectory identifiers associated with the geospatial observations.

8. A method comprising:

receiving a plurality of sequences of geospatial observations from discrete trajectories;

aligning the discrete trajectories to generate aligned geospatial observations;

concatenating the aligned geospatial observations;

performing attentional clustering on the concatenated, aligned geospatial observations to obtain a set of entities with feature dimensionality;

processing the set of entities through an iterative attentional model incorporating a Gated Recurrent Unit (GRU) gating pattern to obtain attentional layer outputs, wherein the gating pattern is equivalent to multiple GRU gating modules in parallel, each processing its own stream of values as multiplexed by an attentional layer based on an inducing vector that iteratively updates;

generating, from one or more Set Transformers, a feature set of map object geometries based, at least in part, on the attentional layer outputs;

updating a map geometry based on the feature set from each of the one or more Set Transformers to form an updated map geometry;

updating a map database to include the map geometry including the map object geometries from the geospatial observations; and providing for at least one of navigational assistance or at least semi-autonomous vehicle control based on the updated map geometry.

9. The method according to claim 8, wherein each of the one or more Set Transformers correspond to an object type, wherein the feature set from each of the one or more Set Transformers comprises a set of map object geometries of the object type.

10. The method according to claim 8, wherein the feature set comprises location information associated with a respective map object geometry.

11. The method according to claim 8, wherein the map object geometries comprise point objects and linear objects, wherein point objects comprise at least one of signs or poles, and wherein linear objects comprise at least one of road markings or road boundaries.

12. The method according to claim 11, wherein the point objects and linear objects from the geospatial observations are used to facilitate autonomous vehicle control.

13. The method according to claim 8, wherein aligning the discrete trajectories to generate the aligned geospatial observations comprises applying a drive offset to each of the discrete trajectories to generate the aligned geospatial observations.

14. The method according to claim 8, wherein the plurality of sequences of geospatial observations from discrete trajectories include unique trajectory identifiers for each discrete trajectory, wherein concatenating the aligned geospatial observations comprises causing the apparatus to remove removing the unique trajectory identifiers associated with the geospatial observations.

15. A computer program product comprising at least one non-transitory computer-readable storage medium having computer-executable program code instructions stored therein, the computer-executable program code instructions comprising program code instructions to:

receive a plurality of sequences of geospatial observations from discrete trajectories;

align the discrete trajectories to generate aligned geospatial observations;

concatenate the aligned geospatial observations;

perform attentional clustering on the concatenated, aligned geospatial observations to obtain a set of entities with feature dimensionality;

process the set of entities through an iterative attentional model incorporating a Gated Recurrent Unit (GRU) gating pattern to obtain attentional layer outputs, wherein the gating pattern is equivalent to multiple GRU gating modules in parallel, each processing its own stream of values as multiplexed by an attentional layer based on an inducing vector that iteratively updates;

generate, from one or more Set Transformers, a feature set of map object geometries based, at least in part, on the attentional layer outputs;

update a map geometry based on the feature set from each of the one or more Set Transformers to form an updated map geometry;

update a map database to include the map geometry including the map object geometries from the geospatial observations; and provide for at least one of navigational assistance or at least semi-autonomous vehicle control based on the updated map geometry.

16. The computer program product according to claim 15, wherein each of the one or more Set Transformers correspond to an object type, wherein the feature set from each of the one or more Set Transformers comprises a set of map object geometries of the object type.

17. The computer program product according to claim 15, wherein the feature set comprises location information associated with a respective map object geometry.

18. The computer program product according to claim 15, wherein the map object geometries comprise point objects and linear objects, wherein point objects comprise at least one of signs or poles, and wherein linear objects comprise at least one of road markings or road boundaries.

19. The computer program product according to claim 18, wherein the point objects and linear objects from the geospatial observations are used to facilitate autonomous vehicle control.

20. The computer program product according to claim 15, wherein the program code instructions to align the discrete trajectories to generate the aligned geospatial observations comprise program code instructions to apply a drive offset to each of the discrete trajectories to generate the aligned geospatial observations.

* * * * *

UNITED STATES PATENT AND TRADEMARK OFFICE
CERTIFICATE OF CORRECTION

PATENT NO. : 12,399,033 B2  
APPLICATION NO. : 17/652953  
DATED : August 26, 2025  
INVENTOR(S) : Tero Juhani Keski-Valkama It is certified that error appears in the above-identified patent and that said Letters Patent is hereby corrected as shown below:

In the Claims

In Column 26, Lines 49-50, Claim 14, delete "comprises causing the apparatus to remove" and insert -- comprises --, therefor.

Signed and Sealed this  
Tenth Day of February, 2026

John A. Squires  
*Director of the United States Patent and Trademark Office*